US012752713B1

(12) United States Patent
Butterfield et al.

(10) Patent No.: US 12,752,713 B1
(45) Date of Patent: Oct. 6, 2026

(54) RETRACTABLE SUPPORT SYSTEM

(71) Applicants: Lena Renee Butterfield, Hailey, ID (US); Benjamin Zachary Leopold, Hailey, ID (US)

(72) Inventors: Lena Renee Butterfield, Hailey, ID (US); Benjamin Zachary Leopold, Hailey, ID (US)

( * ) Notice: Subject to any disclaimer, the term of this patent is extended or adjusted under 35 U.S.C. 154(b) by 167 days.

(21) Appl. No.: 18/783,624

(22) Filed: Jul. 25, 2024

Related U.S. Application Data

(60) Provisional application No. 63/531,371, filed on Aug. 8, 2023.

(51) Int. Cl.
*B60R 9/06* (2006.01)

(52) U.S. Cl.
CPC .................................... *B60R 9/06* (2013.01)

(58) Field of Classification Search
CPC ... B60R 9/06; B60P 1/003; B60P 3/14; A47B 1/08; A47B 2001/085; A47B 1/10
USPC ........ 224/400, 403; 296/26.09; 108/93, 102, 108/143, 157.1
See application file for complete search history.

(56) References Cited

U.S. PATENT DOCUMENTS

| | | | | | |
|---|---|---|---|---|---|
| 7,789 | A * | 11/1850 | Shoenberger | A47B 1/08 | 108/93 |
| 602,509 | A * | 4/1898 | Klein | A47B 1/08 | 108/83 |
| 1,272,983 | A * | 7/1918 | Menzo | A47B 35/00 | 160/202 |
| 1,597,086 | A * | 8/1926 | Lutz | A47B 1/08 | 108/93 |
| 4,263,854 | A * | 4/1981 | Moore | A47B 5/006 | 108/68 |
| 5,052,878 | A * | 10/1991 | Brockhaus | B60P 1/003 | 224/403 |
| 5,083,828 | A | 1/1992 | Accettura | | |
| 6,644,712 | B1 | 11/2003 | Rafi-Zadeh | | |
| 9,770,097 | B2 * | 9/2017 | Ehrreich | A47B 9/20 | |
| 11,634,085 | B2 * | 4/2023 | Luckette | B60R 9/065 | 224/403 |
| 12,036,953 | B2 * | 7/2024 | Liffring | B60R 9/042 | |

* cited by examiner

*Primary Examiner* — Adam J Waggenspack
(74) *Attorney, Agent, or Firm* — COATS & BENNETT, PLLC

(57) ABSTRACT

A retractable support system for use with a vehicle. The retractable support system includes a series of support structures. Each of the structures includes an upper supporting frame. The various structures are sized to enable them to be connected together in a telescoping arrangement. The structures can be selectively positioned in various arrangements that extend different amounts within the vehicle.

18 Claims, 12 Drawing Sheets

RETRACTABLE SUPPORT SYSTEM

RELATED APPLICATIONS

This application claims priority to U.S. Provisional Application No. 63/531,371, filed Aug. 8, 2023, the disclosure of which is incorporated by reference herein in its entirety.

TECHNICAL FIELD

The present application relates generally to support systems and, more specifically, to support systems having multiple structures and configured to be positioned between a stowed position that occupies a first amount of space and an extended position that occupies a larger second amount of space.

BACKGROUND

Users of vehicles such as but not limited to pickup trucks, commercial vans, sport utility vehicles (SUV), box trucks, and various other motor vehicles, use aftermarket support systems. These systems are used for a variety of applications including, but not limited to storage and sleeping. The platform can store a variety of different types of objects on the platform, such as but not limited to bikes, bedding, various recreational items (e.g., tents, canoes), shelving, motorcycles, and tools.

An issue with existing support systems is they occupy a relatively large amount of space in the vehicle which prevents the vehicle from being used for its intended purpose. In one example, an existing support system mounted in a bed of a pickup truck prevents the bed from being used for other purposes such as hauling items. The existing support systems do not collapse and cannot be moved out of the way when not in use. In other words, the system typically requires removal from the vehicle when not in use. The support systems cannot be stowed away while remaining in the vehicle when not in use. Because of this, the vehicle with the support system is not able to accommodate larger, heavier, and/or taller items such as but not limited to home appliances, and large outdoor recreation items.

Another issue is that existing support systems are fixed systems that do not have open underneath storage. Additionally, the systems do not collapse meaning that storage is limited to the top of the platform. Space under the platform is not able to be fully utilized for storage, such as for long items including but not limited to skis, camping chairs, wood planks for construction, plastic storage containers and/or built in drawers.

SUMMARY

One aspect is directed to a support system configured to be positioned in a vehicle. The support system comprises support structures comprising a first support structure and one or more collapsible support structures with each of the support structures comprising a frame with support arms that are spaced apart and a front member that extends between and is connected to the support arms. The support system also comprises a platform. The support structures are connected together in a telescoping manner with the support arms of the one or more collapsible support structures extending over and being supported by the front member of a preceding one of the support structures. The support structures are movable relative to each other between retracted and extended positions. The platform is configured to extend over the frames of exposed ones of the support structures.

In another aspect, two or more of the support structures comprise legs that extend downward from the front member and with a distal end configured to contact against a floor of the vehicle.

In another aspect, the first support structure has a greater length than the collapsible support structures for the collapsible support structures to be positioned within an envelope of the first support structure in the retracted position.

In another aspect, legs of the first support structure are aligned along a line with legs of one of the collapsible support structures in the retracted position.

In another aspect, the support arms of a first one of the collapsible support structures contact against top edges of legs of the first support structure to support the support arms during movement between the extend and retracted positions.

In another aspect, the platform is divided into sections with a width of each of the sections corresponding to a width of one of the support structures on which it contacts against in the extended position.

In another aspect, a top edge of the frames of the support structures are aligned within a plane in the extended position.

One aspect is directed to a support system configured to be positioned in a vehicle. The support system comprises a fixed support structure comprising a fixed support structure frame, a fixed support structure cross member, and fixed support structure legs that extend downward from the fixed support structure frame that support the fixed support structure frame above a floor of the vehicle. A mid support structure comprises a mid support structure frame positioned on and supported by the fixed support structure cross member, and a mid support structure cross member, mid support structure legs that extend downward from the mid support structure frame and to support the mid support structure frame above the floor of the vehicle. An end support structure comprises an end support structure frame positioned on and supported by the mid support structure cross member. The support system is configured to be positioned between a retracted position and extended positions. The retracted position comprises the mid support structure and the end support structure positioned within the fixed support structure. The extended positions comprising one or both of the mid support structure and the end support structure positioned outward from the fixed support structure.

In another aspect, top edges of the fixed support structure frame, the mid support structure frame, and the end support structure frame are aligned in a common plane.

In another aspect, the mid support structure frame comprises arms that are spaced and that contact against and are supported by the fixed support structure cross member.

In another aspect, the fixed support structure comprises a greater length than the mid support structure for the mid support structure to be positioned within the fixed support structure in the retracted position.

In another aspect, a platform is positioned on and supported by the fixed support structure frame, the mid support structure frame, and the end support structure frame.

In another aspect, the platform is divided into sections that are movably joined together with the sections comprising a first section that extends over the fixed support structure, a second section that extends over the mid support structure, and a third section that extends over the end support structure.

One aspect is directed to a method of using a support system that is positioned on a floor of a vehicle. The method comprises: positioning the support system in a retracted position with a first support structure and a second support structure in an overlapping configuration; positioning a platform on the first support structure when the support system is in the retracted position; pulling the second support structure outward away from the first support structure to an extended position and sliding arms of the second support structure across a cross member of the first support structure; supporting the second support structure in the extended position by contacting the arms of the second support structure on the cross member of the first support member; and extending the platform over the first support structure and the second support structure.

In another aspect, the method further comprises: pulling a third support structure outward away from the second support structure to a second extended position and sliding arms of the third support structure across a cross member of the second support structure; supporting the third support structure in the second extended position by contacting the arms of the third support structure on the cross member of the second support member; and extending the platform over the first support structure, the second support structure, and the third support structure.

In another aspect, the method further comprises pulling the second support structure and the third support structure together as a unit outward away from the first support structure to the extended position.

In another aspect, the method further comprises positioning the second support structure and the third support structure in an overlapping configuration in the extended configuration.

In another aspect, the method further comprises contacting legs of the first support structure and the second support structure on the floor and supporting the first and second support structures in both the retracted position and the extended position.

In another aspect, the method further comprises maintaining the first support structure stationary while pulling the second support structure outward away from the first support structure to the extended position.

One aspect is directed to a single unit retractable support system comprising a fixed support structure component, mid support structure, end collapsible structure components and a platform. The components are selectively positionable between a retracted position with the mid support structure and the end collapsible structure components nested within the fixed support structure and an extended position with the mid support structure extended outward from the fixed support structure and the end collapsible structure components extended outward from the mid support structure.

In another aspect, each of the fixed support structure component, mid support structure, and end collapsible structure components are connected together as a single unit.

In another aspect, each of the fixed support structure component, mid support structure, and end collapsible structure components comprise a support section configured to support the platform and one or more comprises legs that extend downward to contact the vehicle to support the platform.

In another aspect, the platforms of the fixed support structure component, mid support structure, and end collapsible structure components are aligned in a common plane for the platform to be flat when the components are in the extended position.

In another aspect, the fixed support structure arms are configured to rest on the wheel well.

In another aspect, the fixed support structure has a top section that supports the platform and one or more legs that extend below the top section and are configured to rest on the floor of the vehicle interior.

In another aspect, the system comprises slides that provide for moving the mid support structure and end collapsible structure components between the extended and retracted positions.

In another aspect, spaces are formed between the legs of the fixed support structure component, mid support structure, and end collapsible structure components in the extended position, the spaces being positioned below the platform.

In another aspect, drawers are sized to fit within the spaces.

In another aspect, the fixed support structure component remains engaged with the mid support structure in the extended position to transfer weight from the platform to the vehicle.

In another aspect, the mid support structure remains engaged with the end collapsible structure components in the extended position to transfer weight from the platform to the vehicle.

The features, functions and advantages that have been discussed can be achieved independently in various aspects or may be combined in yet other aspects, further details of which can be seen with reference to the following description and the drawings.

DETAILED DESCRIPTION

The present application is directed generally to a retractable support system for use with a vehicle. The retractable support system includes a series of support structures. Each of the structures includes an upper supporting frame. The various structures have progressively smaller sizes to enable them to be connected together in a telescoping arrangement.

The structures can be selectively positioned in various arrangements that extend different amounts within the vehicle.

In some examples, the structures include a fixed support structure and one or more collapsible support structures. The structures are configured to position the upper frames at a specified height above the vehicle surface. In the stowed position, the collapsible support structures are retracted and stored within the envelope of the fixed support structure. In the extended positions, one or more of the collapsible support structures are moved outward from the envelope of the fixed support structure. The positioning of the collapsible support structures can vary depending upon the required size of the overall support system.

In the various positions, the system is generally open underneath so that the space under the upper frames can be used for the storage of other items. In some examples, at least one drawer is positioned in the space and can be used for storage.

In some examples, the retractable support system also includes a platform. The platform can include various shapes and sizes. In some examples, the platform can be adjusted in size to extend over the various structures in the various positions. In the stowed position, the platform is sized to extend over just the exposed fixed support structure. When in the various extended positions, the platform is extended over the fixed support structure and the exposed collapsible support structures. The platform is configured to be supported by the upper frames of the various structures.

Figure 1A:
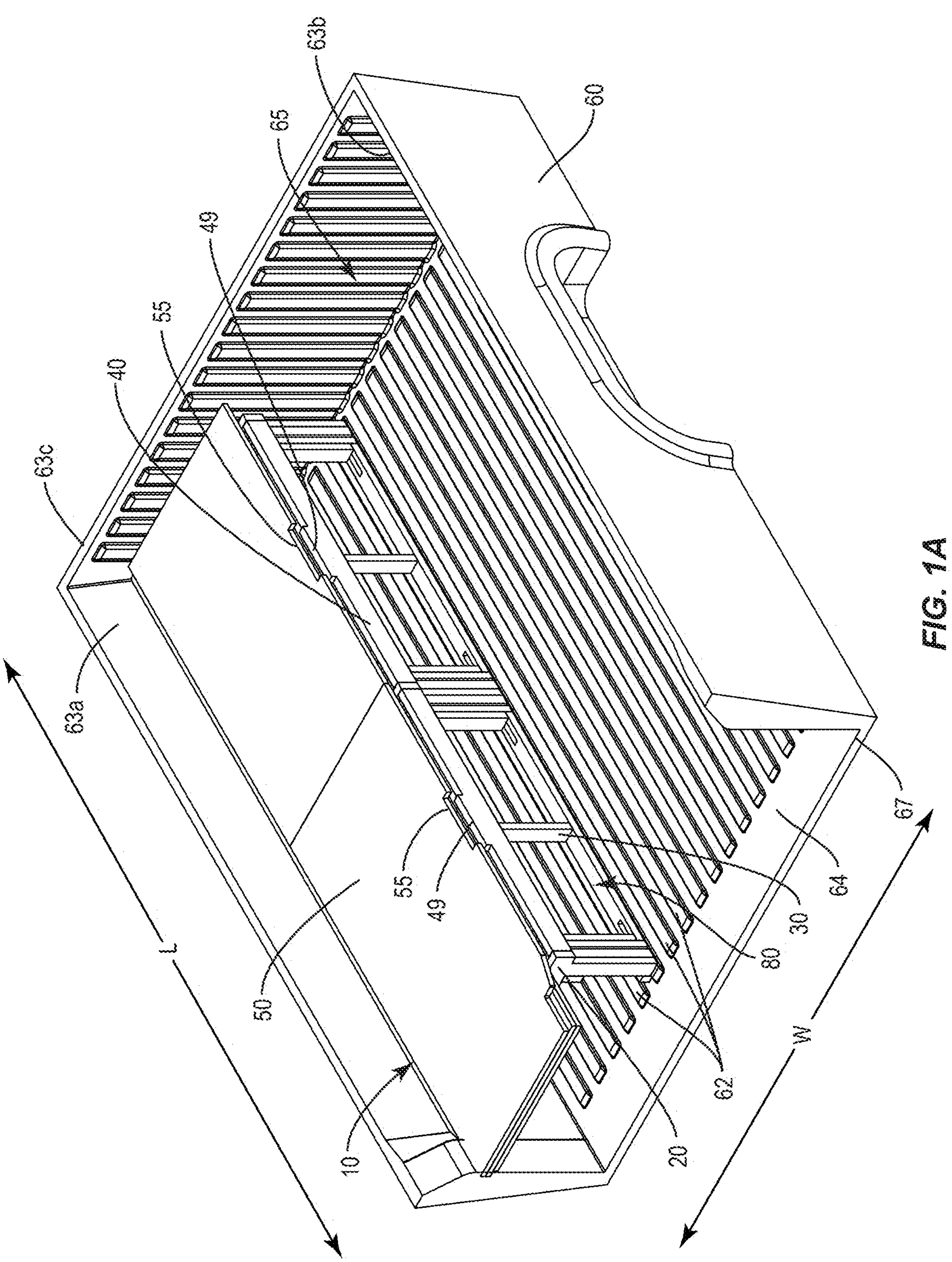
FIG. 1A is an isometric view of a support system in a retracted position located in a bed of a vehicle.

FIG. 1A illustrates a retractable support system 10 in the stowed position that includes the fixed support structure 20, and one or more collapsible support structures 80. The number of collapsible support structures 80 can range from a single structure to multiple structures. In this example, the collapsible support structures 80 includes a mid support structure 30, and an end support structure 40. The support system 10 also includes a platform 50. In the stowed position, the platform 50 is in a folded position and extends over the fixed support structure 20.

The support system 10 is configured for use with a vehicle 60. In the example of FIG. 1A, the vehicle 60 is a pickup truck with a bed 65. The bed 65 includes a floor 64 and side walls 63. In the example of FIG. 1A, the bed 65 includes a width W measured between opposing lateral side walls 63*a*, 63*b*, and a length L measured between a rear side wall 63*c* and a front edge 67. In some examples, a pivoting door (not illustrated) is mounted at the front edge 67 to enclose the bed 65. The support system 10 is configured to be used with a variety of different vehicles 60 including but not limited to a pick up truck (as illustrated in FIG. 1A), a box truck with an interior space, an SUV, and a van with an interior space. In one example as illustrated in FIG. 1A, the retractable support system 10 is illustrated in the bed 65 of a pickup truck bed. In other examples, the retractable support system 10 is utilized in a variety of other vehicle types including by not limited to floors within vans, box trucks, SUVs, and various recreation and work vehicle types.

Figure 1B:
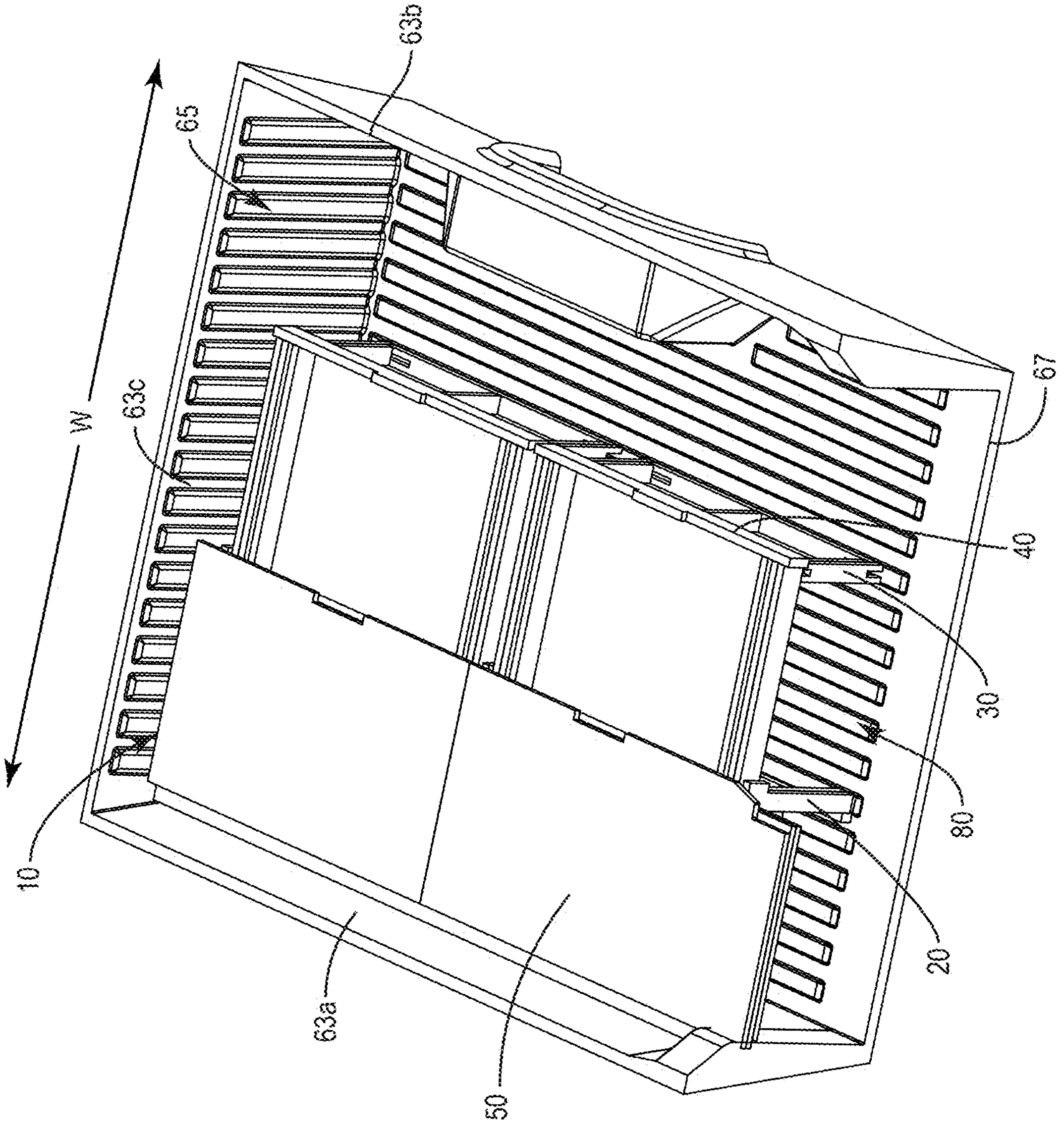
FIG. 1B is an isometric view of the support system of FIG. 1A now in one of the extended positions and with a platform in a folded orientation.

FIG. 1B illustrates the retractable support system 10 of FIG. 1A now in one of various extended positions. This includes the mid support structure 30 extended outward beyond the envelope of the fixed support structure 20. An end support structure 40 is in retracted position within the envelope of the mid support structure 30. In the extended position of FIG. 1B, the support system 10 extends across an additional portion of the width W of the bed 65. The support system 10 is spaced away from the side wall 63*b*. This spacing enables a portion of the bed 65 to remain open for storage.

Figure 1C:
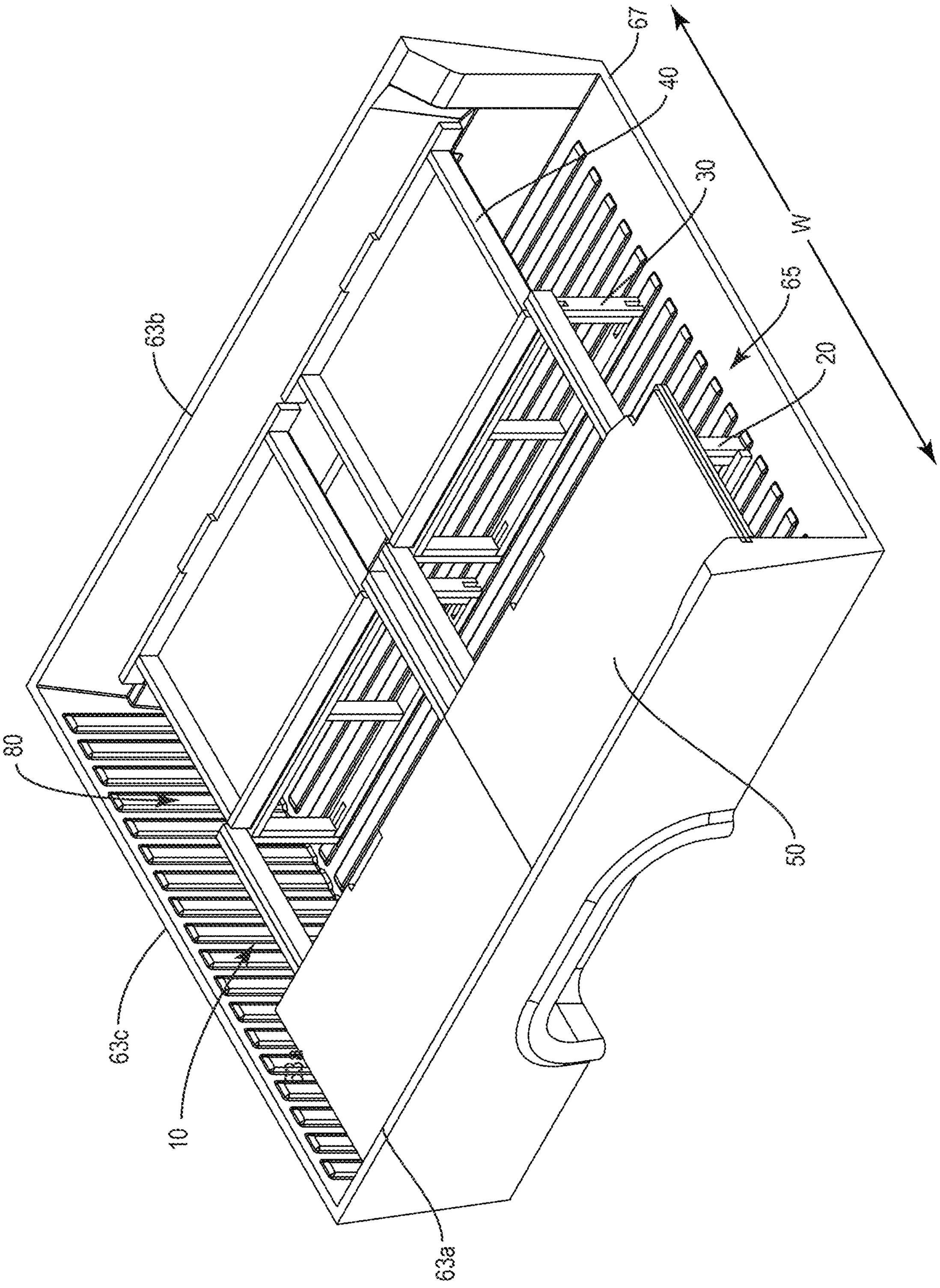
FIG. 1C is an isometric view of the support system of FIGS. 1A and 1B in a fully extended position and with the platform in the folded orientation.

FIG. 1C illustrates the support system 10 of FIGS. 1A and 1B in another extended position. In this example, the support system 10 is at a fully extended position. The support system 10 includes the collapsible support structure 80 that includes both of the mid support structure 30 and the end support structure 40 in extended positions. The support system 10 extends across the width W of the bed 65. The fixed support structure 20 is positioned at side wall 63*a* and the end support structure 40 is positioned at side wall 63*b*.

In some examples, the support system 10 extends across the entire length L of the bed 65. In other examples, the support system 10 extends across a limited section of the length L. This smaller size enables a portion of the bed 65 to be used for other purposes, such as storing and/or hauling other items.

In each of FIGS. 1A, 1B, and 1C, the platform 50 is in the stowed position. This includes the platform 50 having a size that extends just over the fixed support structure 20. The platform 50 is configured to be extended additional amounts to extend over varying amounts of the collapsible support structures 80.

The collapsible support structures 80 can be positioned at varying degrees of extension between the retracted position and the fully extended position. For example, the mid and end support structure 30, 40 can be positioned at various amounts of extension outward from the fixed support structure 20. The various extended positions extend across varying amounts of the width W of the bed 65.

Figure 2:
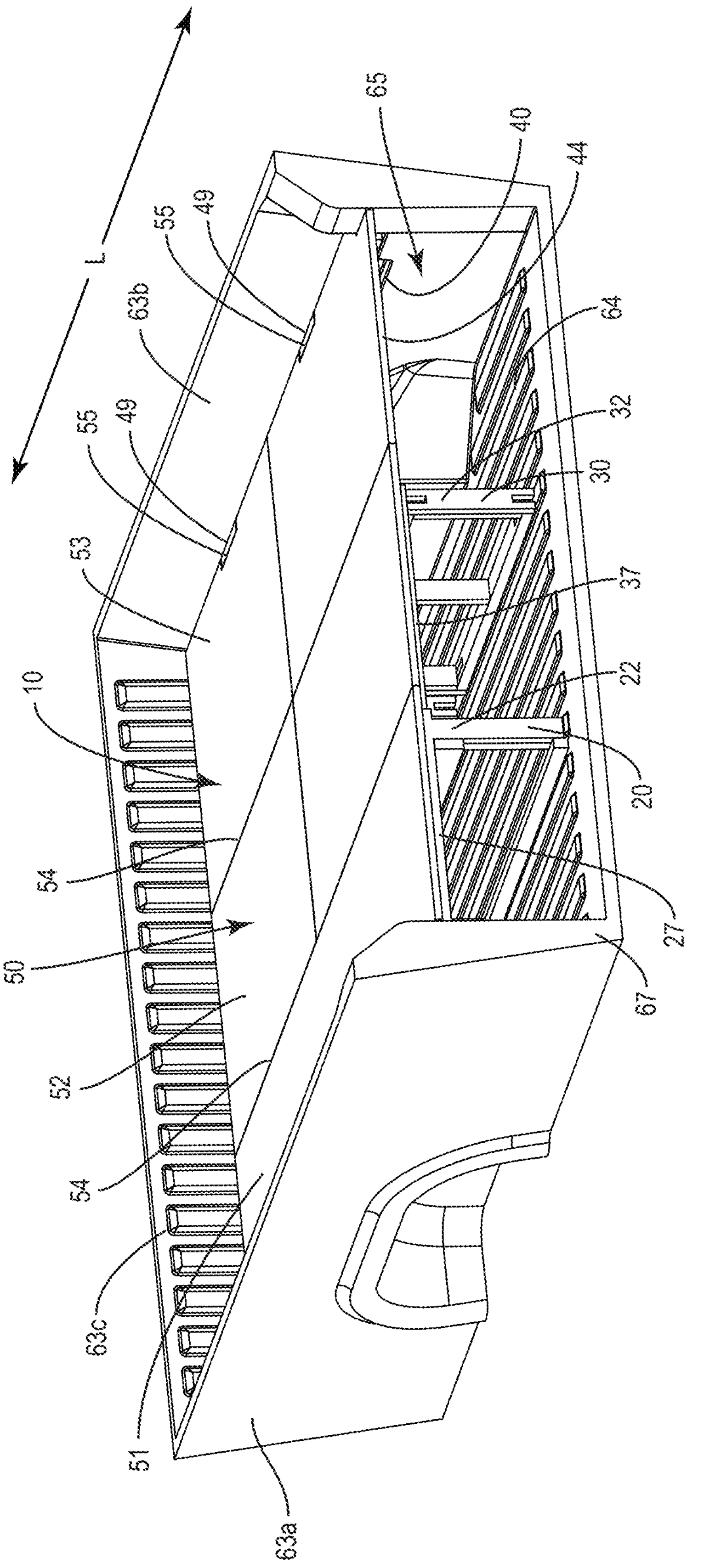
FIG. 2 is an isometric view of a support system in a fully extended position and with a platform extended outward over the top of the support system.

FIG. 2 illustrates the support system 10 with the mid and end support structures 30, 40 in extended positions. The platform 50 is configured to extend over each of the fixed support structure 20, mid support structure 30, and end support structure 40. The platform 50 includes a fixed section 51, a mid section 52, and an end section 53. In this example, the sections 51, 52, 53 are pivotally connected together to provide for movement between the stowed and extended positions. In one example, the sections 51, 52, 53 are connected by hinges. In another example, the platform 50 is a single unit with the sections 51, 52, 53 separated by fold lines that provide for the adjusting the size. In the stowed position, the sections 51, 52, 53 are folded together in an overlapping configuration. In some examples, the faces of the adjacent sections 51, 52, 53 contact together in the stowed position to reduce the overall size in the stowed position. In other examples, two or more of the sections 51, 52, 53 are spaced apart in the stowed position. In some examples, the fixed section 51 is fixed to the fixed support structure 20 with the mid and end sections 52, 53 not connected to either of the mid support structure 30 or the end support structure 40. This configuration enables the fixed section 51 to remain connected to the fixed support structure 20 with the other sections 52, 53 configured to move between the various positions. In another example, none of the sections 51, 52, 53 are connected to the support structures 20, 30, 40 which enables the platform 50 to be removed when not being used.

FIG. 2 illustrates the platform 50 in the extended position with the fixed section 51, the mid section 52, and the end section 53 aligned in a plane. This enables the platform 50 to form a continuous surface to extend across the support system 10. In some examples, this alignment in a common plane is more comfortable for a user that sleeps on the platform 50. The level alignment also facilitates supporting items without the items sliding towards a lower section.

The shapes and sizes of the different platform sections can vary. In the example of FIG. 2, the platform 50 includes a single platform fixed section 51, two mid sections 52, and two end sections 53. These various sections extend across the length L of the bed 65. In other examples, the different sections can be constructed from various different numbers and shapes of sections. In some examples, the platform 50 is sized to extend over the various support structures 20, 30, 40 when in the extended position. In other examples, the platform 50 is smaller or larger than the support structures 20, 30, 40.

Figure 3:
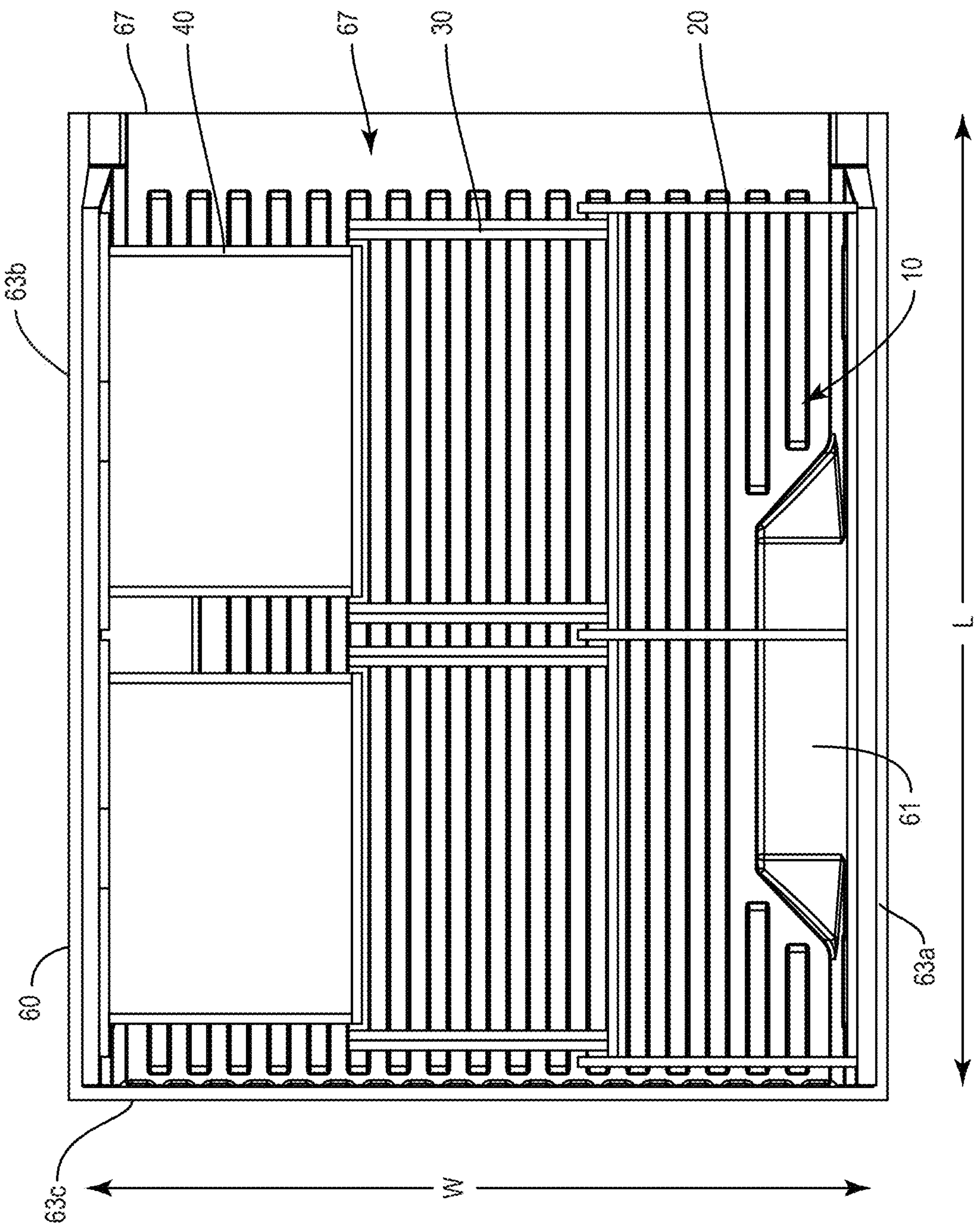
FIG. 3 is a top view of a support system in a fully extended position across a width of a bed of a vehicle.

FIG. 3 illustrates a schematic top view of the fixed support structure 20, mid support structure 30, and end support structure 40 positioned in the bed 65 of a vehicle 60. In this example, the support system 10 is in an extended position that extends across the width W of the bed 65. The support system is further sized to extend across the length L. In some examples as illustrated in FIG. 3, the extended positions extend substantially across width W and length L of the bed 65. In other examples, the extended positions is sized to extend across a limited portion of the width W and/or length L. In the example of FIG. 3, the support system 10 does not include a platform 50.

Figure 4:
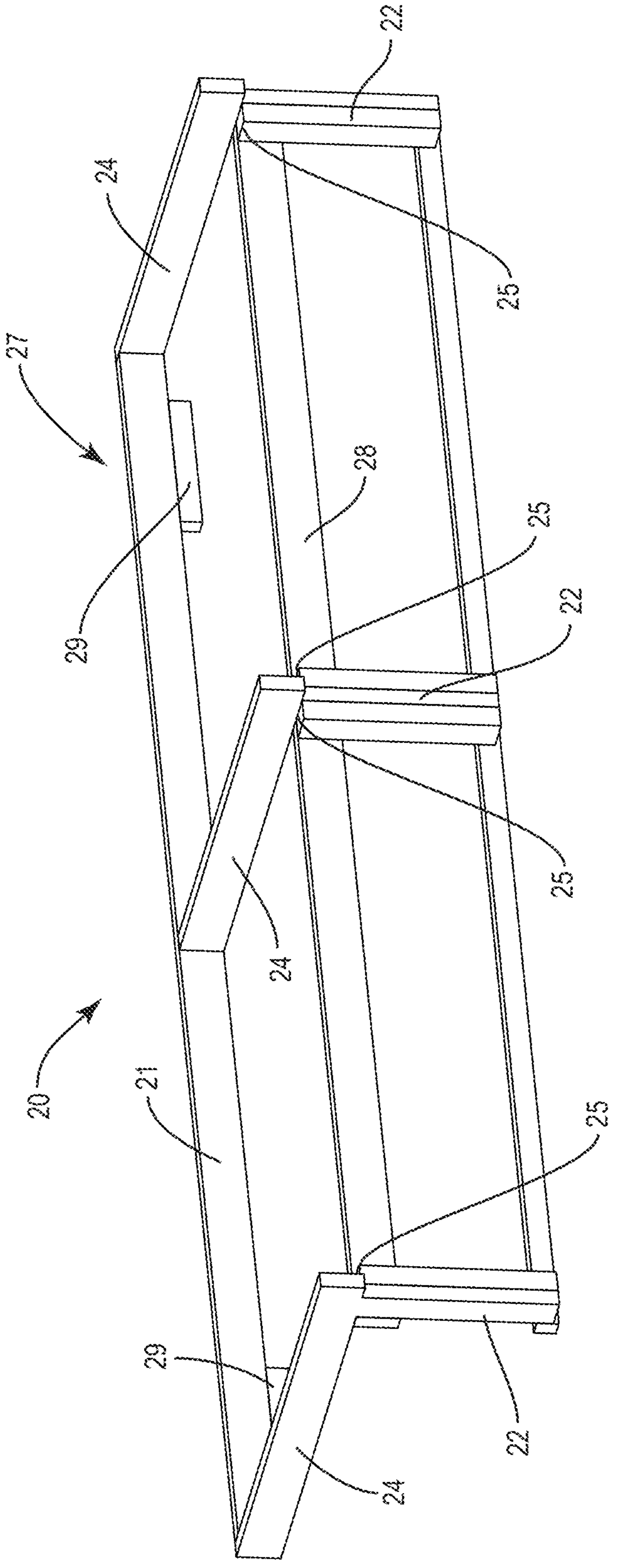
FIG. 4 is an isometric view of a fixed support structure.

FIG. 4 illustrates the fixed support structure 20 that includes a brace 21. The brace 21 includes an elongated shape that is formed by one or more members. The brace 21 is positioned to contact against and be supported by a wheel well 61 (see FIG. 3) within the bed 65. In some examples, the brace 21 is supported by one or more extensions on one or both of the side walls 63*a*, 63*c*, or legs that extends downward to contact against the bed. Arms 24 are connected to and extend outward from one side of the brace 21. The arms 24 are spaced apart along the length of the brace 21. In some examples, the arms 24 are aligned perpendicular to the brace 21. The brace 21 and arms 24 form an upper frame 27.

Legs 22 extend downward from the arms 24 and are configured to contact against the floor 64 of the bed 65. In some examples (not illustrated), legs also extend downward from the brace 21. The legs 22 are sized to support the upper frame 27 above the floor 64. The legs 22 are also configured to support the upper frame 27 to be substantially level when the brace 21 contacts against the wheel well 61 and/or the legs 22 contact the floor 64. A cross member 28 extends across the length opposite from the brace 21. The cross member 28 can be formed by one or more sections.

The fixed support structure 20 also includes one or more support surfaces 25. The support surface 25 is configured to engage with the mid support structure 30 to transfer the load to the legs 22 in the extended position. In some examples, the support surfaces 25 are formed by the upper edges of the legs 22. Additionally or alternatively, the support surfaces 25 are formed by an upper edge of the cross member 28.

In some examples in which the support system 10 is used in a vehicle without a wheel well, the fixed support structure includes one or more legs that extend from the brace 21. These legs support the back side of the fixed support structure 20.

In some examples as illustrated in FIG. 4, the fixed support structure 20 is formed as a single unitary member. In other examples, the fixed support structure 20 is formed by two or more separate sections that are placed adjacent to one another when in use.

Figure 5:
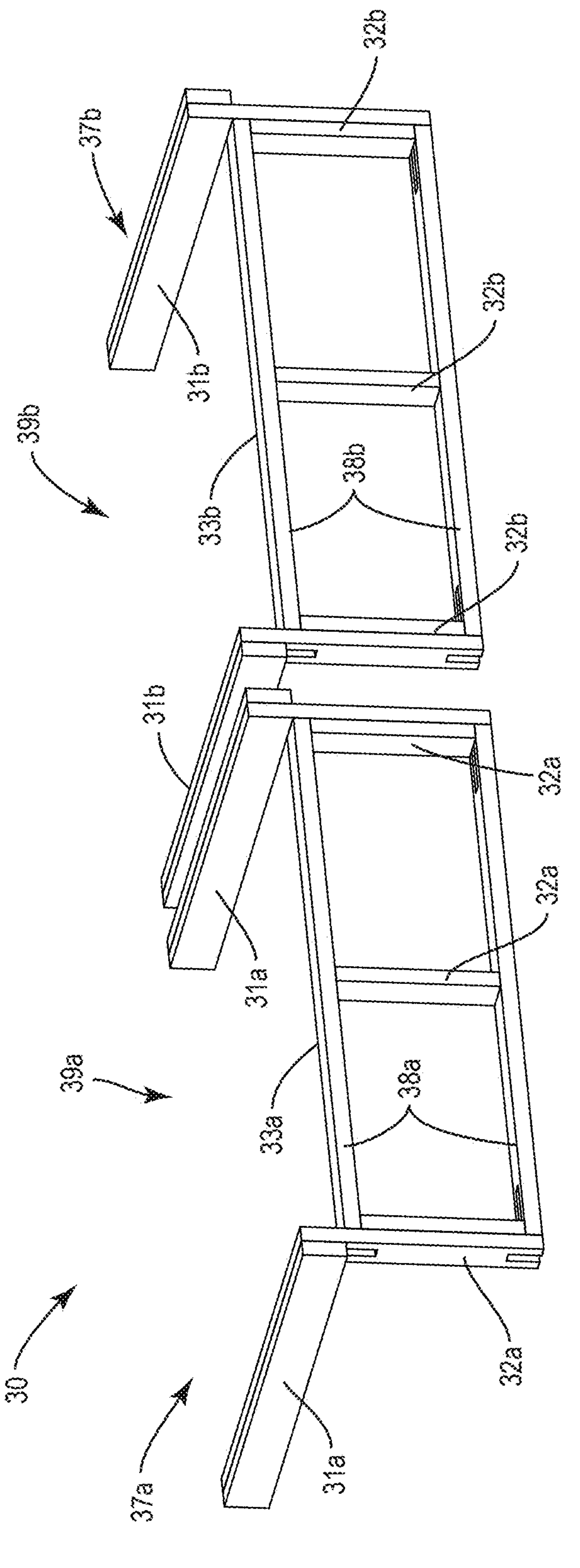
FIG. 5 is an isometric view of a mid support structure.

FIG. 5 illustrates the mid support structure 30. As with the fixed support structure 20, the mid support structure 30 can be formed by one or more sections. In this example of FIG. 5, the mid support structure 30 is formed by two sections 39A, 39B that are positioned in an adjacent manner across the length of the bed 65. In the example of FIG. 5, the two sections 39A, 39B are substantially the same. In other examples, the two or more different sections have different constructions.

The sections 39A, 39B include arms 31*a*, 31*b* that are spaced apart and connected together by one or more cross members 38*a*, 38*b*. In some examples, the arms 31*a*, 31*b* are perpendicular to the cross members 38*a*, 38*b*. The arms 31*a*, 31*b* form the upper frame 37*a*, 37*b*. Legs 32*a*, 32*b* extend downward from the arms 31*a*, 31*b* and/or cross members 38*a*, 38*b*. The legs 32*a*, 32*b* are configured to contact against the floor 64 and support the upper frame 37*a*, 37*b* at an elevated position. Support surfaces 33*a*, 33*b* are formed on the upper surfaces of one or both of the cross members 38*a*, 38*b* and legs 32*a*, 32*b*.

Figure 6:
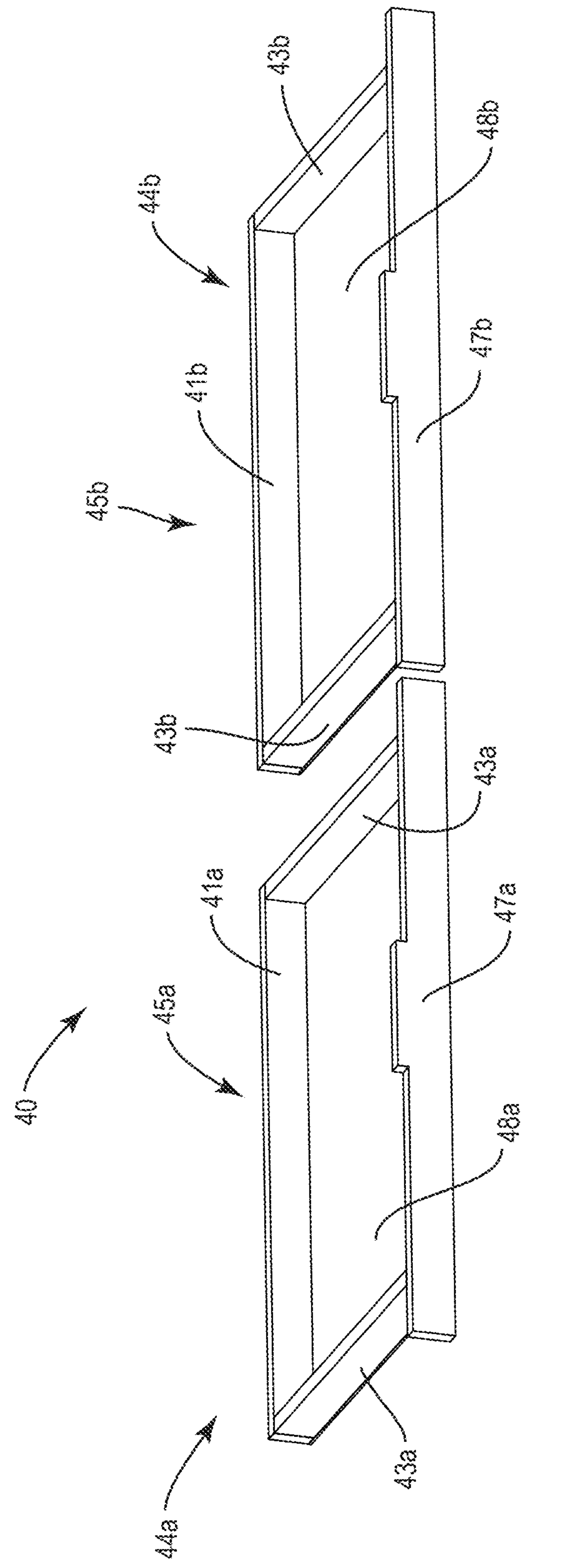
FIG. 6 is an isometric view of an end support structure.

FIG. 6 illustrates an end support structure 40. The end support structure 40 can be formed by one or more sections. FIG. 6 includes sections 45A, 45B that are positioned adjacent to each other along the length L of the bed 65.

The end support structure 40 includes first support members 41*a*, 41*b*, arms 43*a*, 43*b*, and braces 47*a*, 47*b*. In some examples (not illustrated), legs extend downward from the braces 47 for support. In some examples, the first support members 41*a*, 41*b* are parallel with the braces 47*a*, 47*b*, and perpendicular to the arms 43*a*, 43*b*. These components form an upper frame 44*a*, 44*b* of the end support structure 40. A floor 48*a*, 48*b* extends along a bottom edge of the upper frame 44*a*, 44*b* respectively. In some examples, the floor 48*a*, 48*b* is a thin, planar member, such as a piece of plywood or sheet metal.

The fixed support structure 20 and collapsible support structures 80 are configured to support the upper frames 27, 37, 44 at an elevated position above the floor 64. The components are further configured to support items up to various weights that are loaded on the platform 50.

Figure 7:
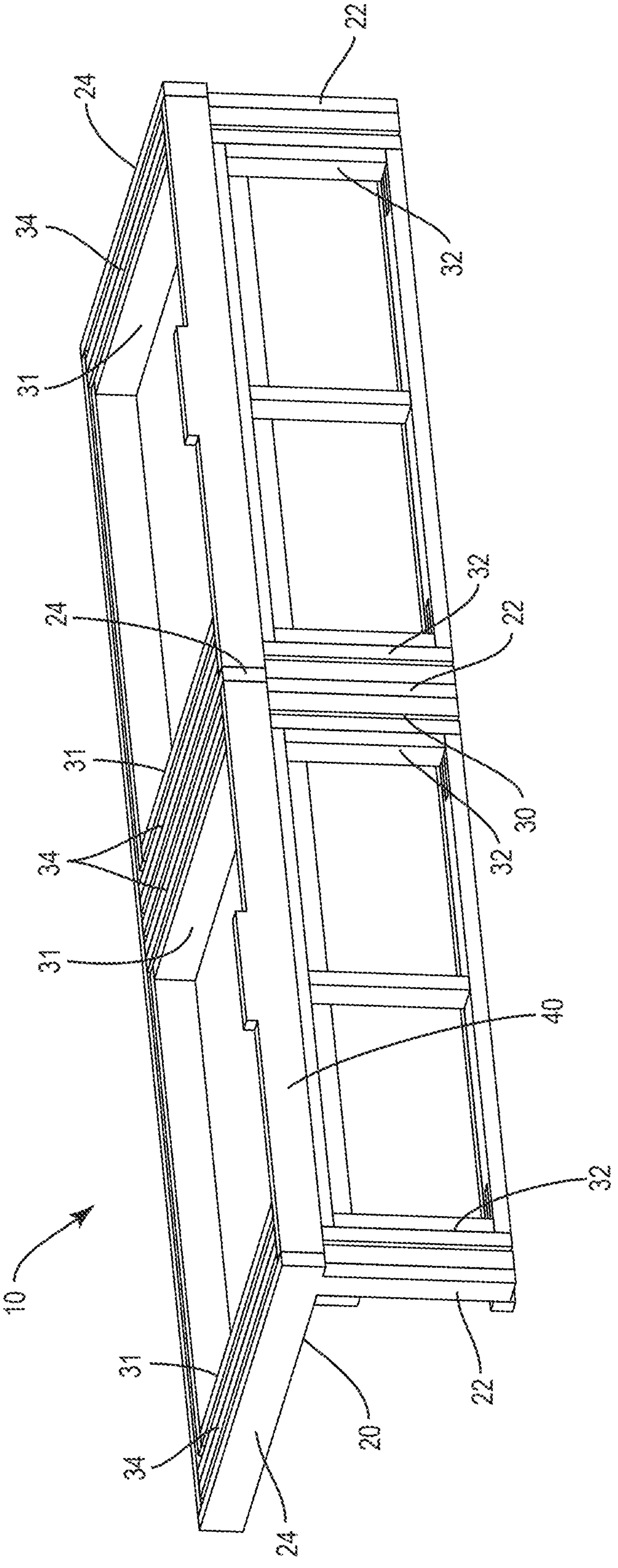
FIG. 7 is an isometric view of a support system in a retracted position.

The fixed support structure 20 and collapsible support structures 80 are connected together to enable selective positioning between the extended and retracted positions. As illustrated in FIG. 7, the mid support structure 30 is connected to the fixed support structure 20 by one or more slides 34. The slides 34 include a pair of sections that are connected respectively to the arms 24 of the fixed support structure 20 and the arms 31 of the mid support structure 30. The sections of the slides 34 engage together and enable sliding movement of the mid support structure 30 relative to the fixed support structure 20 between the extended and retracted positions.

Figure 8:
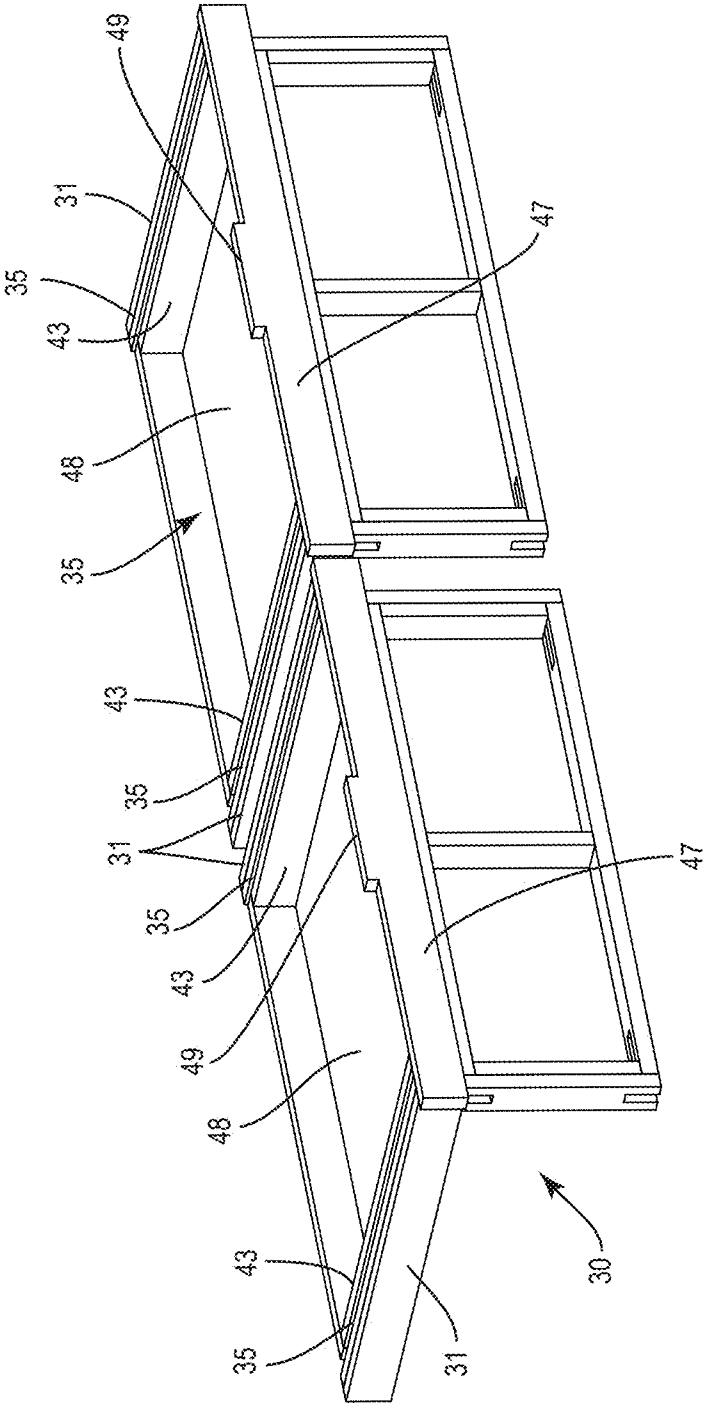
FIG. 8 is an isometric view of a mid support structure and an end support structure positioned together.

Similarly the end support structure 40 is connected to and movable relative to the mid support structure 30 through slides 35. As illustrated in FIG. 8, the slides 35 are connected to the arms 31 of the mid support structure 30 and arms 43 of the end support structure 40. The slides 35 engage together and enable the sliding movement of the end support structure 40 relative to the mid support structure 30 between the retracted and various extended positions.

The fixed support structure 20 and collapsible support structures 80 have a reducing length that enable the telescoping movement between the extended and stowed positions. That is, fixed support structure has a length that enables the mid support structure 30 to move within its envelope in the retracted position. Likewise, the mid support structure 30 has a length that enables the end support structure 40 to move within its envelope in the retracted position. This difference in lengths along the various components enables the telescoping movement.

FIG. 7 illustrates the interaction of the fixed, mid, and end support structures 20, 30, and 40 in the fully retracted position. In this example, the legs 22, 32 of both the fixed and mid support structures 20, 30 are aligned in a straight line to extend along the length L of the bed 65. In some examples in which the floor 64 of the bed 65 includes raised ribs 62, this positioning provides for the legs 22, 32 to each be positioned on a raised rib 62 that extends along the length L of the bed 65. In other examples, the legs 22, 32 are offset from one another in a non-linear arrangement and the different legs are positioned between raised ribs 62 and/or on different raised ribs 62.

The fixed support structure 20 and one or more collapsible support structures 80 are connected together and provide support. When the mid support structure 30 is fully extended, the arms 31 rest on the support surfaces 25 of the fixed support structure 20. This interaction transfers and distributes the load of the arms 31 directly into the legs 22 of the fixed support structure 20. In some examples when the support system 10 is fully extended, the arms 31 are positioned directly onto the support surfaces 25, the legs 32 are positioned on the floor 64, and the arms 41 of the end support structure 40 are positioned onto the support surfaces 33 of the mid support structure 30.

When the end support structure 40 is fully extended, the brace 47 is positioned at the side wall 63 of the bed 65. In some examples, the brace 47 contacts against and is supported by a wheel well 61 in the bed 65. Additionally or alternatively, the brace 47 is supported by one or more extensions that extend outward from one or more of the side walls 63*b*, 63*c*. In some examples, legs on the brace 47 contact against the floor 64 and provide support.

In some examples as illustrated in FIG. 2, the platform 50 includes hinges 54 that extend along the length connect together the different sections 51, 52, 53. Center lines of the hinges 54 are centered over the legs 22, 32 that are spaced apart along the length of the bed 65. In a specific example, the hinge 54 between platform sections 51 and 52 is centered directly over the legs of 22 while the hinge 54 between platform sections 52 and 53 is centered directly over legs 32.

In some examples, the end support structure 40 is supported by the wheel well 61 at the side wall 63*b* and the legs 32 of the mid support structure 30, while the mid support structure 30 is supported by its own legs 32 and the legs 22 of the fixed support structure 20 which itself is supported by its own legs 22 and the wheel well 61 at the side wall 63*a*.

When the end support structure 40 is extended from the mid support structure 30, the arms 43 of the end support structure 40 rest on the support surfaces 33 of the mid support structure 30. This interaction transfers and distributes the load of the arms 43 directly into the legs 32 of the mid support section 30.

Figure 9:
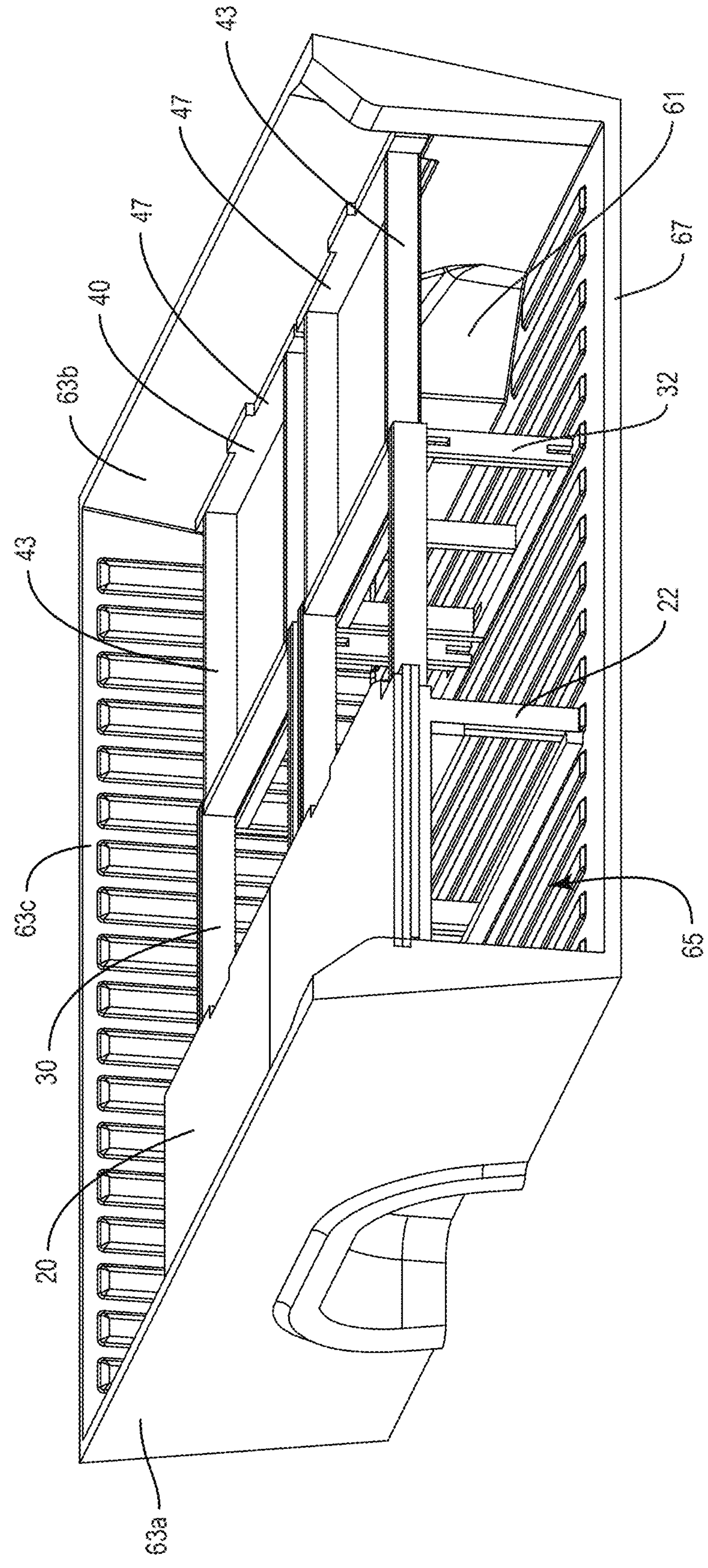
FIG. 9 is an isometric view of a support system in an extended position across a bed of a vehicle.

FIG. 9 illustrates the interaction of the end support structure 40 and the bed 65. The braces 47 rests on the wheel well 61 and/or side wall 63*b*. In other examples where there is no wheel well 61, side wall 63 or other vehicle features, legs (not illustrated) extend downward from the braces 47 to transfer the load directly down into the floor 64.

In some examples, the support system 10 is configured to be supported on the top edges of the side walls 63. Legs can extend downward from one or more of the supports 20, 30, 40 to contact against the floor 64 and provide support.

Figure 10:
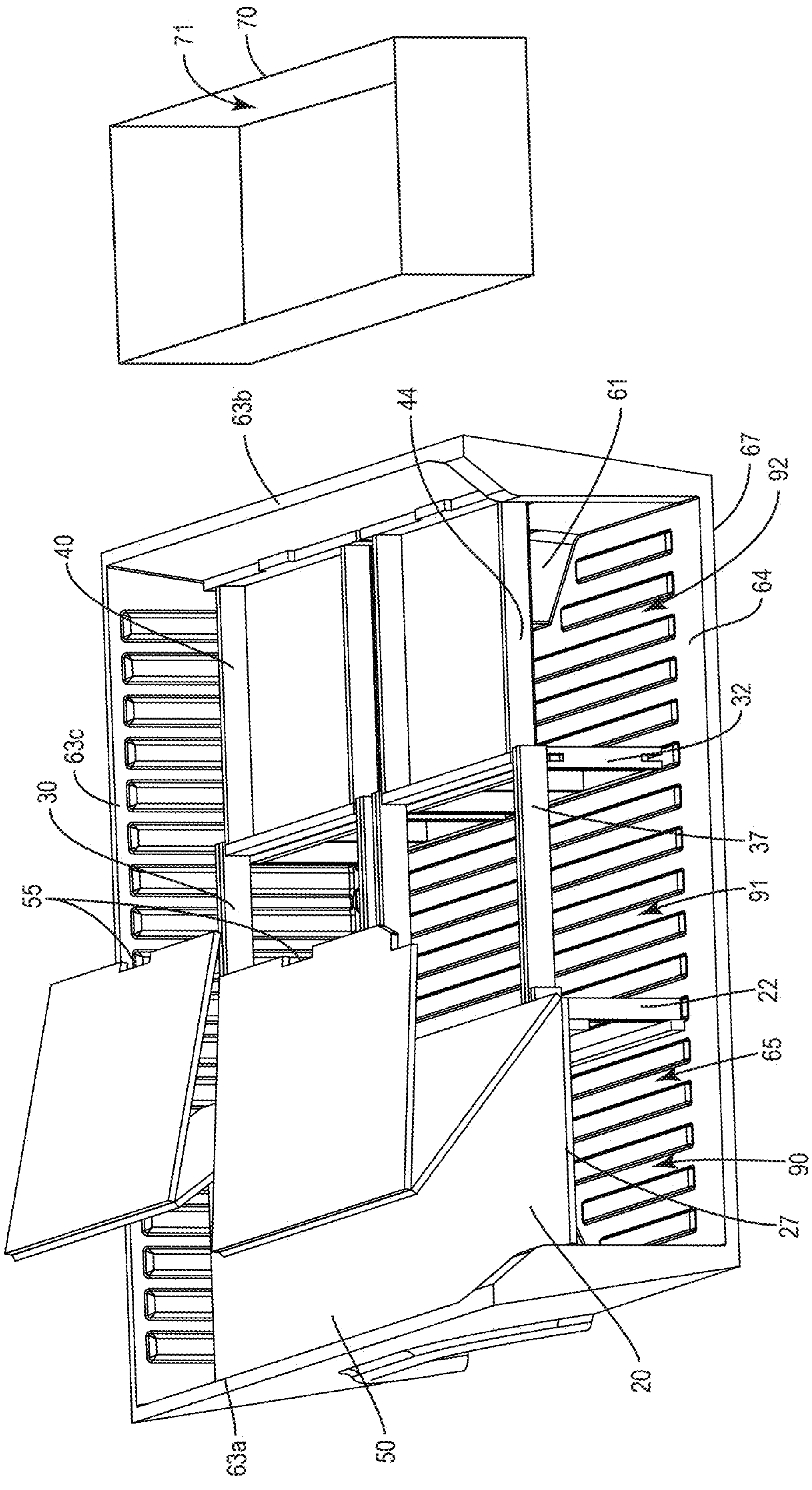
FIG. 10 is an isometric view of a support system in an extended position across a bed of a vehicle and a drawer configured to fit underneath.

FIG. 10 illustrates the free, or empty space, underneath the upper frames 27, 37, 44 when in a fully extended position. The free space includes space 90 formed at the fixed support structure 20, space 91 formed at the mid support structure 30, and space 92 formed at the end support structure 40. The free spaces 90, 91, 92 allow access to the floor 64 of the bed 65 and can be used for storage, hauling, or as otherwise purposed by the user.

In some examples, one or more drawers 70 are sized to fit into the free spaces 90, 91, 92. The drawers 70 can be slid into and out of the spaces 90, 91, 92. The drawer 70 includes an interior space 71 for storage. In some examples, the drawer 70 includes slides, rollers, wheels to enable the movement along the floor 64. In other examples, the bottom of the drawer 70 is flat and contacts against and slides on the floor 64.

In some examples, the upper frames 27, 37, 44 are configured to contact against and support the platform 50. In some examples, the upper frames 27, 37, 44 are substantially level for the platform 50 to be level. This makes for more comfortable sleeping when the platform 50 is used for sleeping. The level positioning can also facilitate support items as they do not tend to shift. In examples without a platform 50, the level upper frames 27, 37, 44 can be used to support various items, such as but not limited to plywood or a canoe.

The support system 10 supports itself on one or more of the floor 64, wheel wells 61, and side walls 63.

In some examples, the support system 10 is a single unit with multiple interacting components that slide and interact to move between the extended and retracted positions. In other examples, the support system 10 include two or more modular components that are pieced together. With this singular unit design, the system 10 can be removed from the vehicle as a single unit with no disassembly. With multiple components, the components can be individually removed from the vehicle 60.

The system 10 can be positioned at a variety of different positions within a vehicle. In one example as illustrated in FIG. 1A, the support system 10 stows against the side wall 63*a* and extends towards the opposing side wall 63*b*. In other examples, the support system 10 stows against the back side wall 63*c*, or opposing side wall 63*b* and extends outward along the bed 65.

In some examples, the platform 50 is configured to be collapsed and stowed away. In one example, this is accomplished with piano hinges 54. In other examples this is accomplished with multiple hinges or other features in the platform 50 that allow for back and forth folding motion of the sections.

The platform 50 can also have other constructions that enable adjusting in size. In some examples, the platform 50 includes different sections that are independent. In one specific example, the platform includes a different section corresponding to each of the different structures. In other examples, the platform 50 is configured to be rolled and unrolled as required to assume the desired dimensions.

In some examples, the components of the support system 10 are designed to interact with one another to hold the support system 10 in the various positions. When in the retracted position, the end support structure 40 holds the mid support structure 30 in place as depicted in FIG. 8. The profile of the brace 47 is larger than the length of the mid support structure 30. This prevents the mid support structure 30 from sliding past the end support structure 40 and causes the mid support structure 30 to stay in the retracted position unless end support structure 40 is extended. In some examples, the end support structure 40 is held in the retracted position by the collapsed platform 50. This is accomplished by the end section 53 of the platform 50 contacting directly against the brace 47 restricting the movement of the end support structure 40 thus restricting the movement of the entire support system 10.

In some examples, one or more holding features 55 and 49 interact to create a holding mechanism to maintain the support system 10 in the extended position. The brace 47 includes one or more projections 49 (see FIG. 8) and the platform 50 includes one or more cut outs 55 (see FIG. 10) in the end section 53. The projections 49 are sized to fit into the cut outs 55. When the platform 50 is fully extended as illustrated in FIG. 2, the cut outs 55 interact with the projections 49 to hold the support system 10 in the extended position which restricts undesired movement. To disengage the holding features, the end section 53 is pivoted upward. This interaction holds the system 10 in the extended position until the end section 53 is repositioned out of the extended position to be retracted. In this example, these locking features are cutouts and extensions of the platform 50 and end support structure 40. In other examples, these features could be features extending from the platform into cavities of the end support structure or other locking mechanisms.

The retractable support system 10 utilizes the vehicle interior features. Because of this, there is no need to bolt, strap, tie, restrain, or otherwise lock in the support system 10 to the vehicle 60. Pressure is created when the end support structure 40 is fully extended and contacts one or more of the wheel well 61, side walls 63, and floor 64. Additionally or alternatively, the support system 10 can be secured to the vehicle 100 in additional manners, such as tie-downs, ropes, bracing, etc.

In some examples as illustrated in FIG. 4, the fixed support structure 20 includes one or more restriction members 29 that extend downward from the brace 21. The restriction members 29 engage with the features of the vehicle 60, such as the wheel well 61 and/or side walls 63*a*, 63*c* to restrict the movement along the length L of the bed 65.

The support system 10 can be made from a variety of materials. Examples include but are not limited to wood, plastic, and metal.

In some examples, the support system 10 is designed to rest on the wheel wells 61. In order to retract the system fully, the fixed support structure 20 positions the upper frame 27 high enough above the floor 64 to provide clearance for the collapsible support structures 80 in the retracted position.

One example of use starts with the support system 10 in the retracted position. In the retracted position, the fixed support structure 20, the mid support structure 30, and the end support structure 40 are in retracted position. The mid support structure 30 and the end support structure are within the envelope of the fixed support structure 20. In some examples, the mid support structure 30 and the end support structure 40 are positioned underneath the upper frame 27. In some examples, the support system 10 is positioned against one side wall 63 of the bed 65.

To move the support system 10 to one of the extended positions, the mid support structure 30 and end support structure 40 are pulled outward from the fixed support structure 20. In some examples, the end support structure 40 remains within the envelope of the mid support structure 30. In other examples, the end support structure 40 is pulled outward from the mid support structure 30.

In examples with one or more holding features 49, 55, the holding features are released by lifting up on the platform 50. This removes the contact and interaction of the holding features 49, 55, and enables the mid support structure 30 and end support structure 40 to be pulled outward from the fixed support structure 20.

In some examples, to fully extend the support system 10, the mid support structure 30 is fully extended from the fixed support structure 20 and the end support structure 40 is fully extended from the mid support structure 30. The end support structure 40 is moved outward until the brace 47 rests on the wheel well 61. Once fully extended, the legs 32 of the mid support structure 30 are positioned on the floor 64 of the bed 65. Additionally, the arms 43 of the end support structure 40 are positioned directly over the legs 32 of the mid support structure 30 and supported by the support surfaces 33. Similarly, the arms 31 of the mid support structure 30 are directly over the legs 22 of the fixed support structure 20 and supported by the support surfaces 25.

With the fixed support structure 20, the mid support structure 30, and the end support structure 40 in the fully extended position, the platform 50 is extended and pulled across the width. The platform 50 is supported by the upper frames 27, 37, 44. In some examples, the sections 51, 52, 53 of the platform 50 are substantially in the same plane. In some examples, holding features are engaged to maintain the platform 50 in the extended position across the width.

In some examples in which the platform 50 includes hinges 54, when the system is fully extended the hinges 54 and seams of the platform 50 that extend along the length are positioned and supported directly over the legs 22 and 32. The seams along the width direction of the platform 50 are positioned between the different sets of components 20, 30, 40. The side edges of the platform 50 are supported by one or more of the wheel wells 61 and floor 64.

In some examples, retracting the system starts by lifting the front most platform end section 53 off the surface of the end support structure 40. The platform end section 53 is moved towards the fixed support structure 20, such as through rolling or in a folding and pivoting motion. This causes the platform mid section 52 to follow. The process is continued until the platform sections 51, 52, 53 are positioned on top of the fixed support structure 20.

After the platform 50 is retracted, the end support structure 40 and mid support structure 30 are retracted. The brace 47 is pulled towards the fixed support structure 20. The motion of the end support structure 40 causes the mid support structure 30 to follow until fully nested under the retracted platform 50 and within the envelope of the fixed support structure 20. The larger profile of the brace 47 of the end support structure 40 prevents the mid support structure 30 from moving in the opposite (extended) direction.

In some examples, the support system 10 can be removed from the vehicle 60 as a single unit when in the retracted position. In other examples, one or more of the components are detached and removed separately from a remainder of the support system 10.

In some examples, one or more of the slides 34, 35 include rollers, bearings, features/grooves, locating features incorporated into the arms 31, 43.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A support system configured to be positioned in a vehicle, the support system comprising:
   - support structures comprising a first support structure and one or more collapsible support structures, each of the support structures comprising a frame with support arms that are spaced apart and a front member that extends between and is connected to the support arms;
   - a platform;
   - wherein the support structures are connected together in a telescoping manner with the support arms of the one or more collapsible support structures extending over and being supported by the front member of a preceding one of the support structures;
   - wherein the support structures are movable relative to each other between retracted and extended positions;
   - wherein the platform is configured to extend over the support structures that are exposed; and
   - wherein the support arms of a first one of the collapsible support structures contact against top edges of legs of the first support structure to support the support arms during movement between the extend and retracted positions.

2. The support system of claim 1, wherein the legs of the first support structure extend downward from the front member and with a distal end configured to contact against a floor of the vehicle.

3. The support system of claim 1, wherein the first support structure has a greater length than the collapsible support structures for the collapsible support structures to be positioned within an envelope of the first support structure in the retracted position.

4. The support system of claim 3, wherein the legs are mounted on each of the first support structure and one of the collapsible support structures and wherein the legs of the first support structure are aligned along a line with the legs of the collapsible support structure in the retracted position.

5. The support system of claim 1, wherein the platform is divided into sections with a width of each of the sections corresponding to a width of one of the support structures on which it contacts against in the extended position.

6. The support system of claim 1, wherein a top edge of the frames of the support structures are aligned within a plane in the extended position.

7. A support system configured to be positioned in a vehicle, the support system comprising:
   - a fixed support structure comprising:
     - a fixed support structure frame;
     - a fixed support structure cross member;
     - fixed support structure legs that extend downward from the fixed support structure frame that support the fixed support structure frame above a floor of the vehicle;
   - a mid support structure comprising:
     - a mid support structure frame positioned on and supported by the fixed support structure cross member;
     - a mid support structure cross member;
     - mid support structure legs that extend downward from the mid support structure frame and support the mid support structure frame above the floor of the vehicle;
   - an end support structure comprising:
     - an end support structure frame positioned on and supported by the mid support structure cross member;
   - a platform that is positioned on and supported by the fixed support structure frame, the mid support structure frame, and the end support structure frame;
   - wherein the support system is configured to be positioned between a retracted position and extended positions;
   - wherein the retracted position comprises the mid support structure and the end support structure positioned within the fixed support structure; and
   - wherein the extended positions comprising one or both of the mid support structure and the end support structure positioned outward from the fixed support structure.

8. The support system of claim 7, wherein top edges of the fixed support structure frame, the mid support structure frame, and the end support structure frame are aligned in a common plane.

9. The support system of claim 7, wherein the mid support structure frame comprises arms that are spaced and that contact against and are supported by the fixed support structure cross member.

10. The support system of claim 7, wherein the fixed support structure comprises a greater length than the mid support structure for the mid support structure to be positioned within the fixed support structure in the retracted position.

11. The support system of claim 7, wherein the platform is divided into sections that are movably joined together, the sections comprising a first section that extends over the fixed support structure, a second section that extends over the mid support structure, and a third section that extends over the end support structure.

12. The support system of claim 7, wherein the legs of the fixed support structure and the mid support structure are aligned in a row in the retracted position and are spaced apart in the extended positions.

13. A method of using a support system that is positioned on a floor of a vehicle, the method comprising:
   - positioning the support system in a retracted position with a first support structure and a second support structure in an overlapping configuration;
   - positioning a platform on the first support structure when the support system is in the retracted position;
   - pulling the second support structure outward away from the first support structure to an extended position and sliding arms of the second support structure across a cross member of the first support structure;
   - supporting the second support structure in the extended position by contacting the arms of the second support structure on the cross member of the first support member; and extending the platform over the first support structure and the second support structure.

14. The method of claim 13, further comprising:

pulling a third support structure outward away from the second support structure to a second extended position and sliding arms of the third support structure across a cross member of the second support structure;

supporting the third support structure in the second extended position by contacting the arms of the third support structure on the cross member of the second support member; and extending the platform over the first support structure, the second support structure, and the third support structure.

15. The method of claim 14, further comprising pulling the second support structure and the third support structure together as a unit outward away from the first support structure to the extended position.

16. The method of claim 14, further comprising positioning the second support structure and the third support structure in an overlapping configuration in the extended position.

17. The method of claim 13, further comprising contacting legs of the first support structure and the second support structure on the floor and supporting the first and second support structures in both the retracted position and the extended position.

18. The method of claim 13, further comprising maintaining the first support structure stationary while pulling the second support structure outward away from the first support structure to the extended position.

* * * * *